Figure 1:
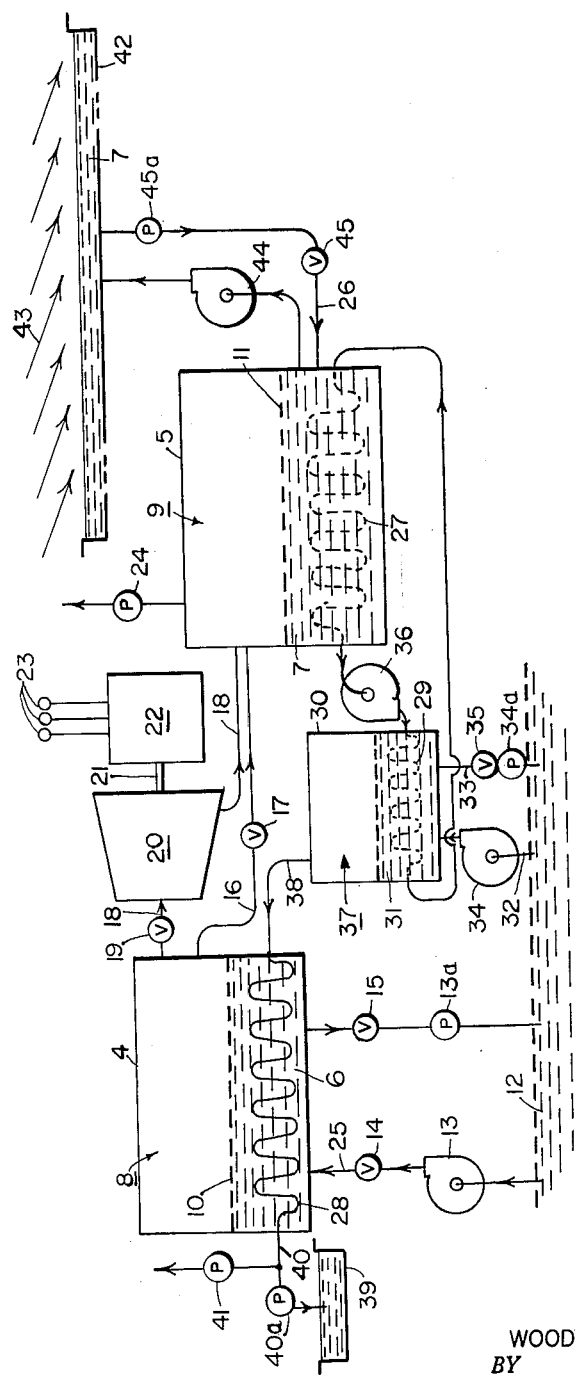

Jan. 29, 1963   W. D. BACHMANN   3,076,096
CONVERSIONS OF SEA WATER AND GENERATING SYSTEMS
Filed May 5, 1960   2 Sheets-Sheet 2

*INVENTOR.*
WOODWARD D. BACHMANN
BY
Dike Thompson & Bronstein
ATTORNEYS 3,076,096
CONVERSIONS OF SEA WATER AND
GENERATING SYSTEMS
Woodward D. Bachmann, Boston, Mass.
(1177 Commonwealth Ave., Allston 34, Mass.)
Filed May 5, 1960, Ser. No. 27,024
15 Claims. (Cl. 290—1)

The present invention relates to improvements in conversions of sea water, particularly for supplying electrical power and distilled water, and more specifically, in one aspect, to novel and improved apparatus and method for generating electricity and distilling saline water whereby energy derived from the ambient atmospheric environment is converted into mechanical and thermal energy through the medium of vapor pressure from sea water.

It is well understood that low-cost electric power and plentiful supplies of fresh water are essential to growth of many of the world's under-developed regions, and that vast areas of such regions are in temperate and tropic zones and at or near coastal locations where sea water supplies are virtually limitless. Conditions in the southern and western parts of the United States are of this character, for example, and offer a demand for power and fresh water, nearness to saline water supplies, large areas of cheap arid land, and abundant sunshine. These conditions have suggested to others that the abundant saline water supplies might be distilled, through relatively slow solar or relatively fast flash evaporation practices, and that the resulting fresh water might be put to the customary uses, including use in conventional boiler-turbine-generator systems for developing electrical power. Evaporating equipment needed to produce commercial quantities of the distilled water tends to be complex and costly, and accessory supplies of fuel are required, particularly for the generation of power. Insofar as solar evaporation can be exploited in known ways, to avoid fueling expenses involved in distillation, this is nevertheless complicated and entails large capital and maintenance expenditures because of the huge proportions of glass-like or mirrored structures which would be required.

According to the present invention, need for the heretofore conventional fuel-fired boiler is obviated, and both the motive power for electrical generators and the elevated temperatures for efficient distillation of sea water are derived from actions involving the release and absorption of water vapor from and into solutions having different concentrations of solute. For these purposes, the solution of lesser concentration conveniently comprises sea water, which is in abundant supply and can be readily replenished as needed, while a specially-prepared solution of higher concentration, which does not occur naturally, is continuously reclaimed in concentrated form due to simple evaporation of its solvent, as by exposure to the ambient atmosphere. The primary source of energy, for derivation of either or both the output of electrical power and the output of fresh water, is that which causes the re-concentration of the higher-concentration solution. Advantageously, this is solar energy, and the system costs are therefore minimized; moreover, only simple evaporation is required for the re-concentration, such that the evaporated solvent need not be recaptured by complex and costly auxiliary structure.

It is one of the objects of the present invention, therefore, to provide novel and improved apparatus and method for generating electric power and distilling sea water.

A further object is to provide improved apparatus and method for generating electricity in response to flow of water vapor from sea water to a solution of higher concentration.

Another object is to provide novel energy conversion apparatus and method whereby sea water and a solution of higher concentration are in heat-exchange and vapor-pressure-exchange relationships which develop motive power and elevation of temperature for generating electricity and for distilling sea water.

Still further, it is an object to provide novel and improved apparatus and method for economically developing electricity and/or distilled water from solar energy through the medium of sea water which is in heat-exchange and vapor-pressure-exchange relationships with a highly concentrated solution which is continuously re-concentrated by exposure to the ambient atmospheric environment.

By way of a summary account of practice of this invention in one of its aspects, I provide a pair of closed tanks each partly filled with a salt solution of concentration vastly different from that of the other, both tanks being evacuated to minimize the number of non-condensible gas molecules in the spaces above the surfaces of the solutions, and both tanks having their evacuated spaces interconnected by a passageway through which the solvent vapor may pass. One of the tanks preferably contains sea water, having the customary dissolved salt constituents as solute, and the other tank preferably contains a very highly concentrated and nearly saturated water solution of one or more soluble salts, such as magnesium chloride, lithium chloride or lithium bromide, which cause the vapor pressure in the latter tank to be low in relation to that of the tank containing sea water. Under these conditions, the higher vapor pressure appearing in the sea water tank forces water vapor through the passageway and into the tank having the highly concentrated solution within it, and the water vapor is there rapidly absorbed by the highly concentrated solution. Turbine apparatus connected into the communicating passageway is rotated at high speed by this flow of water vapor and simultaneously turns the rotor of an electric generator to produce an electrical power output. Vaporization at the surface of the sea water, and concurrent absorption at the surface of the highly concentrated solution, occur at such extraordinary rates that the vapor flow can approach sonic velocities and develop high turbine speeds and torques. The large masses of water vapor involved in this action are transferred in direction to concentrate the sea water and dilute the more highly concentrated solution, thereby tending to make the operation degenerative; to overcome these effects, the supply of low-concentration solution is replenished by pumping from the sea into the one tank, while the diluted solution in the companion tank is pumped into an external evaporating pool from which the more concentrated residue of evaporation is taken into the latter tank as a needed replacement. Vaporization in the sea water tank undesirably tends to lower the temperature and thereby to decrease the vapor pressure at that site, while the absorption in the remaining tank undesirably tends to increase the temperature and thereby to increase the vapor pressure. Both of these unwanted tendencies are conveniently and advantageously overcome by bringing the two solutions into a heat exchange relationship which occasions a satisfactory equilibrium condition, while at the same time introducing further quantities of the sea water into the heat-exchange loop by way of a flash evaporator in which the vaporized sea water absorbs heat from the high temperature tank and delivers needed heat to the low temperature tank where the resulting vapor is condensed to yield fresh water.

Figure 2:
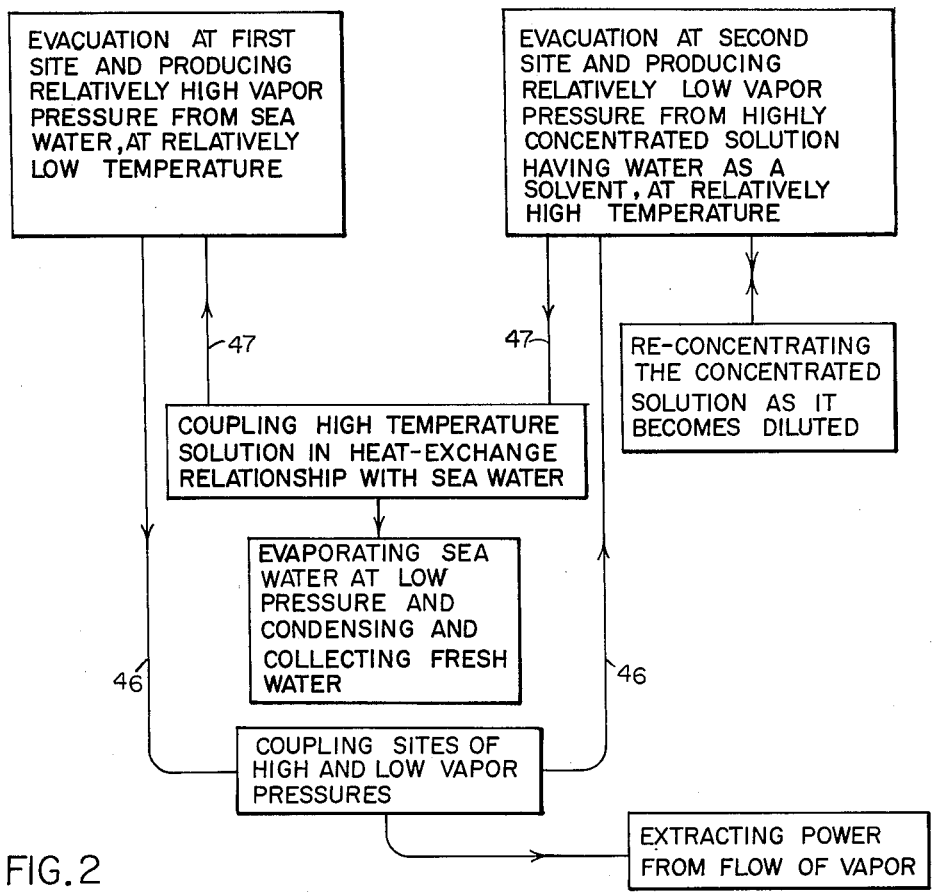
Figure 3:
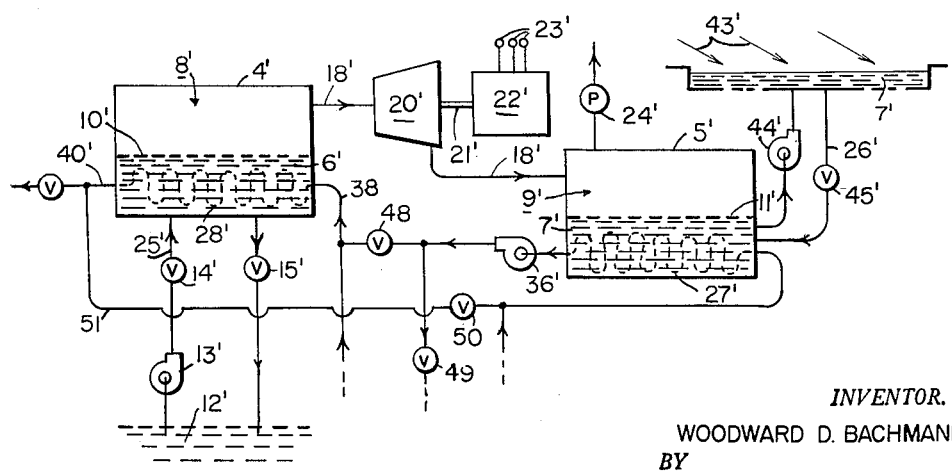

Although the features of this invention which are believed to be novel are set forth in the appended claims, further details of the invention itself and the additional objects and advantages thereof may be readily comprehended through reference to the following description taken in connection with the accompanying drawings, wherein:

FIGURE 1 provides a diagram, partly in schematic and partly in block form, of a salt water conversion system in which teachings of this invention are practiced;

FIGURE 2 is a block diagram which correlates the steps of the improved method for generating power and distilling saline water supplies; and FIGURE 3 is a further system diagram, in block and schematic form, illustrating a modified heat-exchange arrangement in which there is a by-passing of distillation equipment.

Having reference to the FIGURE 1 representation of a preferred conversion system, there is provided a pair of large enclosures or tanks, 4 and 5, which are of liquid- and vapor-tight construction and are capable of withstanding high pressures. These enclosures contain solutions, 6 and 7, respectively, having such different solute concentrations that the respective solutions develop different vapor pressures in the upper tank volumes 8 and 9 above the respective liquid surfaces 10 and 11. Both solutions preferably include water as a solvent, and solution 6 in tank 4 advantageously takes the specific form of low-concentration saline water tapped directly from a neighboring sea supply 12 by pumping equipment 13 and 13a. The associated sea water conduits for this purpose are shown to include valves 14 and 15 which may be opened and closed to permit either continuous or intermittent circulation, and to permit a separate replenishing and drainage of this solution, as required. In general, such water supplies are known to contain slightly over 3.5% mineral matter, more than three fourths of which is common salt (NaCl) and about 11% of which is magnesium chloride. It is also known that such salts even in these low concentrations will have the effect of lowering the vapor pressure of the aqueous solution at a given temperature, although this lowering is relatively slight and is acceptable for present purposes. In contrast, the aqueous solution 7 in the companion tank 5 is relatively highly concentrated with solute, which has the effect of lowering the vapor pressure to a value below that in tank 4, at the operating temperatures involved. Solution 7 is subject to dilution as the operation continues and, because the desired concentrations are so high, it is re-concentrated and the solute is reclaimed rather than entirely replaced. This makes practical the use of even the somewhat costly solutes which are known to yield optimum reductions of vapor pressure, inasmuch as the tank 5 solute is then primarily an item of initial capital expense. Preferred solutes for solution 7 include lithium chloride, lithium bromide, and magnesium chloride. Sodium chloride, the most plentiful and least expensive salt of all, also induces the lowering of vapor pressure to a marked degree for these purposes in high concentrations. Other examples of salts which function in this manner are given in the table "Lowering of Vapor Pressure by Salts in Aqueous Solutions," pages 1800 and 1801 of the "Handbook of Chemistry and Physics," Twenty-fourth Edition, published by Chemical Rubber Publishing Co., Cleveland, Ohio. Sugar likewise lowers the vapor pressure of water, and it will be recognized that the various substances may be introduced into the solution together, to optimize the lowering of vapor pressure without exceeding the saturation concentration of each solute, in a well known manner. The selection of which solutes and what proportions of such solutes will be used in any given concentrated solution will of course largely depend upon routine economic considerations.

The upper tank regions 8 and 9, experiencing the aforesaid different vapor pressures, are coupled together, selectively, by one of two passageways at any time. One of these passageways comprises the illustrated conduit 16, which may bring the regions into communication or not according to the setting of a valve 17. The other includes conduit 18, having a valve 19 therein, and further having a known form of low pressure turbine 20 in series with it to rotate an output shaft 21 in response to high-speed flow of vapor from tank 4 to tank 5. A conventional electric generator 22 is driven by the turbine, which serves as its prime mover, to deliver electrical power output to the electrical load terminals 23. For purposes of developing the desired vapor pressures in the tanks to the exclusion of non-condensible gas pressures from the atmospheric air, the upper regions of the gas-tight tanks are both initially evacuated by suitable pumping mechanism 24, which conveniently comprises a conventional evacuating pump and associated with one of the tanks, as shown, or may alternatively comprise separate pumps coupled with each of the two tanks. During operation of the system, the same pumping mechanism also serves to remove the relatively small amounts of air which are released from the solutions in which they are entrapped.

When the sealed tanks are supplied with the respective solutions of the different concentrations, and when their upper regions have been exhausted of non-condensible gases, the tanks tend to build up significantly different vapor pressures within them. In the case of tank 4 and its low-concentration sea water solution 6, the vapor pressure phenomenon is like that of so-called "flash" evaporation, and under operating conditions the release of water vapor occurs with such rapidity that the surface tends to become violently excited and the outlets for vapor passageways 16 and 18 must be disposed at elevated positions where the solution itself will not enter of its own accord. For this vapor-release condition to persist, rather than to become degenerative and halt, there must also be a concurrent withdrawal of this vapor from tank 4, and this occurs through either of the passageways 16 and 18 as the vapor flows to the site of lower vapor pressure in region 9 of tank 5 and is immediately absorbed by the concentrated solution 7 at an equally rapid rate. Here it must be understood that the pertinent phenomenon associated with the highly concentrated solution 7 is a unilateral one; on the one hand the effect of its solute is to produce a lowered vapor pressure of that solution, and yet on the other hand the water vapor admitted from tank 4 is readily absorbed. No completely satisfying explanation for this phenomenon is known, but the unusual characteristics are highly advantageous to practice of this invention because they are caused to complement the occurrences in the sea water tank.

Temperature conditions in the two tanks also tend to make the operation degenerative, in that the release of vapor from the sea water 6 is attended by withdrawal of heat and serious swift lowering of temperature, while the absorption of this same water vapor by highly-concentrated solution 7 is attended by release of thermal energy to that solution such that it quickly tends to become seriously overheated. This difficulty is understood by recognizing that, even neglecting the problem of freezing, vapor pressure of the sea water tends to become lowered with decreasing temperature, and the vapor pressure of the highly-concentrated solution tends to become higher with elevation of its temperature; both of these effects are in senses which are opposite to those which would sustain operation. A particularly important aspect of this invention therefore concerns a thermal self-compensation which permits the system to function without being cut off by the insufficient and excessive temperatures within the two tanks. This compensation is found in intercoupled exchanger mechanisms, shown as sinuous heat-exchange coils 27 and 28 in intimate heat-exchange relationships with the solutions 7 and 6, respectively. Although an intermediate heat-exchange coil 29 in a flash evaporator tank 30 is also involved for purposes of salt water distillation, the arrangement is essentially one wherein the unwanted excess thermal energy in absorber tank 5 is applied to the solution 6 to prevent it from becoming unduly lowered in temperature and to sustain a balanced set of thermal operating conditions. Inherent in this is the requirement that the temperature in tank 5 be higher than that in tank 4, to permit the flow of thermal energy in the required direction, although this nevertheless produces a set of thermal operating conditions which is opposite to that which would favor the needed differences in vapor pressures in the two tanks. However, it is found that a highly concentrated solution of solutes such as those already referred to will produce a significantly lower vapor pressure at a relatively high temperature than will a relatively low concentration solution, such as sea water, at a relatively low temperature, whereby the vapor will flow in the desired direction from tank 4 to tank 5, as needed, while the thermal energy flows from tank 5 to tank 4, as needed to sustain operation.

Intermediate flash evaporation tank 30 is shown to be partly filled with a supply of sea water 31 by way of circulation conduits 32 and 33, and under control of pumps 34 and 34a and outlet valve 35. Its heat-exchange coil 29 is connected with coil 27 of tank 5, such that the fluid filling them may be circulated by pump 36 to achieve a desired heat exchange between the relatively high temperature solution 7 and relatively cool sea water 31. Alternatively, either of these coils may be eliminated, with the solution in its tank being circulated directly through the other coil or comparable form of heat exchange element. As the sea water in tank 30 becomes heated in this manner, its flash evaporation into the upper tank region 37 is promoted and its water vapor is led through the heat exchange coil 28 of tank 4 by way of conduit 38. The lowering of temperature in tank 30 is offset by the heat delivered from absorber tank 5, and the thermal energy of the water vapor in coil 28 is released to the salt water 6 in tank 4 to offset its decrease in temperature At the same time, the latter water vapor is condensed in coil 28, in the form of fresh water, and is delivered to a suitable reservoir 39 by outlet conduit 40 and pump 40a. Pump 41 serves to evacuate air in the flash evaporation system, to promote the vaporization of the sea water and withdraw air released from its entrapment within the sea water, it being understood that this evacuation is of course arranged in known ways to be either intermittent or at a continuous rate which is merely sufficien to discharge the non-condensible gases. Pump 40a is for the purpose of pumping the liquid fresh water up to atmospheric pressure.

It is likewise essential to prolonged or continuous operation that the diluting effects upon solution 7 caused by its absorption of water vapor from tank 4 be overcome, such that the desired lower vapor pressure conditions will be maintained in tank 5. While the opposite, concentrating, effects in tank 4 are readily counteracted by circulation of comon sea water, there is no comparable natural supply of the highly concentrated solution 7. Therefore, the solution 7 is re-concentrated and reclaimed with negligible loss, and, as illustrated, this is accomplished with special advantage in a large evaporating reservoir 42 exposed to solar radiation 43 and to a dry ambient atmospheric environment. As is common knowledge, arid environmental conditions which induce optimum evaporation for this re-concentration are often experienced at or near coastal locations where the needed supplies of sea water are also plentiful. Reservoir 42 must afford a sufficient surface area for evaporation from the solution 7 to yield a rate of re-concentration under natural evaporating conditions which is equal to the rate of dilution, occurring at the smaller-area surface 11 in tank 5, whereby the design is dictated routinely by the prevailing environmental evaporating conditions and by the desired capacity of the system. In general, the reservoir 43 is of large area but need contain only a shallow depth of the solution 7, and, preferably, the reservoir itself is constructed with a slight incline which causes the diluted solution to gravitate unevenly in paths of slow agitated flow which expose maximum surface areas of the solution and heighten the evaporation and re-concentration. Solar and other ambient envirnomental agencies thus provide the prime source of energy for the system. Auxiliary pump 44, which like the other auxiliary pumps may be energized by electrical output from the generator 22, forces the diluted solution 7 into the reservoir 42 at a position which is preferably widely separated from the return conduit 26, the replenishing being under control of a suitable valve 45 and pump 45a. When serving only to distill saline water, the system is operated with passageway 16 open and by-passing the closed turbine passageway 18, although outputs of both electrical power and fresh water may be secured simultaneously when passageway 16 alone is valved to a closed condition. Intermittent output-producing operation for either purpose is within the contemplation of this invention, as are also the tandem and alternate operation of system components like those which have been described, for the purpose of yielding outputs which are continuous or, selectively, in greater quantity.

In this system, a major portion of the input energy is received from the solar energy which reconcentrates the highly concentrated solution. A further source comprises the thermal energy of the sea water which is introduced into the tanks 4 and 30. Referring to numerical values applicable to a system including a highly concentrated aqueous solution of lithium bromide, and considering low extremes of operating temperatures for purposes of illustration, it is known that at 64.4° F. (18° C.) and a molality of about 12.50, the lithium bromide solution in one tank will develop a vapor pressure of about 3.18 millimeters of mercury. Simultaneously, the sea water in the companion tank at about 33° F. is known to exert a higher vapor pressure of about 4.67 mm. Hg, and the differential pressure promotes vapor flow in the desired direction. The difference in solution temperatures (64.4° F—33.0° F.=31.4° F.) also enables the desired transfer of heat in the wanted direction from the tank containing the highly concentrated solution to the tank containing sea water. With higher operating temperatures in both tanks, which temperatures are more commonly expected, the differences in vapor pressures can be shown to be even more pronounced. Referring to numerical values characterizing operation at such higher temperatures, and having reference to a highly concentrated aqueous solution of magnesium chloride for purposes of a further illustration, it is known that at 100° F. a nearly-saturated aqueous solution of relatively low-cost magnesium chloride in one tank will develop a vapor pressure of about 14.73 mm. Hg. Simultaneously, at a representative temperature of 70° F., the sea water in the companion tank is known to exert a higher vapor pressure of about 18.37 mm. Hg, and the differential pressure promotes vapor flow in the desired direction. The 30 degree difference in sea water and magnesium chloride solution temperatures is of magnitude and sense enabling the wanted transfer of heat from the tank containing the highly concentrated solution to the tank containing the sea water.

A preferred practice utilizing the present teachings is diagrammed in FIGURE 2, wherein the process involves production of electrical power and distilled water as in the case of the system of FIGURE 1. Evacuation is performed at a first site, such as that of the sea water tank already referred to, and a relatively high vapor pressure is produced from the sea water at a relatively low temperature. As is indicated by the diagram coupling lines 46, there is also a coupling of the first site with a second at which there is evacuation and production of relatively low vapor pressure from highly concentrated solution having water as a solvent, and at a relatively high temperature. Paralleling this is a coupling of the high temperature solution at the second site in heat-exchange relationship with the sea water, the oposite sense of this being indicated by the coupling lines 47 of the diagram. The latter part of the process further involves the evaporating of sea water at low pressure, and the condensing and collection of fresh water, while power is extracted from the flow of vapor between the sites of different vapor pressures. The highly concentrated solution is re-concentrated as it becomes diluted, preferably on a continuous basis by exposing the diluted solution to ambient environmental conditions. All of these steps may be, and preferably are, performed simultaneously, although either the steps involved in the extraction of power or the distillation of sea water may be bypassed to favor the other.

In the latter connection, the system depicted in FIGURE 3 illustrates interconnections which are employed to allocate the system power to production of electrical output. Those components which correspond to the system components of FIGURE 1 are identified by the same reference characters, with distinguishing single-prime accents added, and it will be understood that their functions are comparable also. In this system, the coupling of the sites of relatively high and low vapor pressure is by way of the passageway 18' having the turbine 20' connected within it for supplying motive power to generator 22' in response to the vapor flow at high velocities. Heat exchange is achieved by a more direct connection of the heat-exchange coil 27' in absorber tank 5' with the heat-exchange coil 28' in tank 4', the intermediate distillation equipment of the FIGURE 1 system being eliminated or bypassed, as by valves 48, 49 and 50. With valves 48 and 50 opened and valve 49 closed, pump 36 serves to force the heat-exchange medium directly from coil 27' to the coil 28' to cause the excess heat in tank 5' to become dissipated in tank 4' where it is needed, the cooled medium being recirculated to tank 5' by way of the return conduit 51. Either of the heat-exchange coils 27' and 28', or their equivalents, may be eliminated and the solution in its tank circulated directly through the other for this heat exchange purpose. Advantageously, temperatures do not rise to the extent that scaling and clogging by the solute are troublesome, as distinguished from those systems in which saline water is sought to be used in a conventional boiler-turbine system. There being no output of fresh water under these operating conditions, the outlet from conduit 40' is closed to seal the circulation loop for the heat-exchange medium.

Alternatively, the tanks shown as separate units may have certain constructional features in common, as when they are arranged physically one within or adjoining the other, whereby the desired heat-exchange relationships are aided, for example. In addition, the re-concentration may be further accelerated by spraying of the diluted solution into the atmosphere, or the like. Accordingly, it should be understood that the specific embodiments of this invention as disclosed herein are intended to be of a descriptive rather than a limiting nature and that various changes, combinations, substitutions or modifications may be effected in accordance with these teachings without departing in spirit or scope from this invention in its broader aspects.

What I claim as new and desire to secure by Letters Patent of the United States is:

1. Energy conversion apparatus comprising two sealed enclosures each partly filled with a liquid and one of which includes a concentration of solute developing a lower vapor pressure than that of the liquid in the other of said enclosures, means evacuating gas from said enclosures, means providing a passageway for flow of vapor from said other of said enclosures having higher vapor pressure therein to said one of said enclosures having the said concentration of solute and lower vapor pressure therein, means replenishing the supply of liquid in said other of said enclosures, means re-concentrating the solute concentration in said one of said enclosures to prevent the said concentration thereof from becoming weakened, means providing a pathway for flow of thermal energy from said one of said enclosures to said other of said enclosures, and energy utilization means powered by at least one of said flows between said enclosures.

2. Energy conversion apparatus according to claim 1 wherin said re-concentrating means comprises means exposing the liquid containing solute from said one of said enclosures to ambient environmental conditions including solar radiation and returning said liquid to said one of said enclosures.

3. Energy conversion apparatus comprising two sealed enclosures each partly filled with a liquid and one of which includes a concentration of solute developing a lower vapor pressure than that of the liquid in the other of said enclosures, means evacuating gas from said enclosures, means providing a passageway for flow of vapor from said other of said enclosures having the higher vapor pressure therein to said one of said enclosures having the said concentration of solute and lower vapor pressure therein, means replenishing the supply of liquid in said other of said enclosures, means re-concentrating the concentration of solute in said one of said enclosures to prevent the said concentration thereof from becoming weakened, heat-exchange means coupling thermal energy from said one of said enclosures to said other of said enclosures, and means powered by said flow of vapor generating an electrical output.

4. Energy conversion apparatus as set forth in claim 3 wherein said means generating an electrical output comprises a turbine serially connected in said passageway and rotated by said flow of vapor, and an electrical generator rotated by said turbine.

5. Energy conversion apparatus comprising two sealed enclosures each partly filled with a liquid and one of which includes a concentration of solute developing a lower vapor pressure than that of the liquid of the other of said enclosures, means evacuating gas from said enclosures, means providing a passageway for flow of vapor from said other of said enclosures having the higher vapor pressure therein to said one of said enclosures having the said concentration of solute and lower vapor pressure therein, means replenishing the supply of liquid in said other of said enclosures, means re-concentrating the concentration of solute in said one of said enclosures to prevent the said concentration thereof from becoming weakened, means providing a pathway for flow of thermal energy from said one of said enclosures to said other of said enclosures and including therein means for evaporating sea water and condensing fresh water from the vapor thereof responsive to said thermal energy.

6. Energy conversion apparatus according to claim 5 wherein said means providing a pathway for flow of thermal energy comprises a flash evaporator having an enclosure and means supplying sea water thereto and means evacuating gas from said flash evaporator enclosure, first heat-exchange means for coupling thermal energy from said one of said enclosures to said sea water, and second heat-exchange means coupling thermal energy from said vapor of said sea water in said evaporator enclosure to said liquid of said other said enclosures.

7. Energy conversion apparatus comprising first and second sealed enclosures, said first enclosure being partly filled with sea water, said second enclosure being partly filled with a solution having a concentration of solute higher than the concentration of solute in said sea water and developing a vapor pressure in said second enclosure which is lower than the vapor pressure of said sea water in said first enclosure, means evacuating gas from said enclosures, means providing a passageway for flow of vapor from said first enclousre to said second enclosure, means replenishing the supply of sea water in said first enclosure to prevent the concentration of solute therein from increasing, means re-concentrating the said solution in said second enclosure to preserve said lower vapor pressure in said second enclosure, heat-exchange means providing a pathway for flow of thermal energy from said second enclosure to said first enclosure, and energy-utilization means powered by at least one of said flows between said first and second enclosures.

8. Energy conversion appartaus according to claim 7 wherein said replenishing means comprises means for pumping sea water into said first enclosure and for draining concentrated sea water from said first enclosure, and wherein said concentrating means comprises means exposing to ambient environmental conditions, including solar radiation, larger surface areas of said solution from said second enclosure than the exposed surface area of said solution within said second enclosure.

9. Energy conversion apparatus according to claim 8 wherein said energy-utilization means comprises a flash evaporator including a third enclosure and means evacuating gas from said third enclosure and means supplying sea water to said third enclosure, wherein said heat-exchange means comprises a first heat-exchanger applying thermal energy from said solution in said second enclosure to the sea water in said third enclosure, and a second heat exchanger applying thermal energy from vapor from said sea water in said third enclosure to said sea water in said first enclosure to condense said vapor from said sea water in said third enclosure, reservoir means, and means delivering the condensed vapor to said reservoir means.

10. Energy conversion apparatus according to claim 7 wherein said heat-exchange means includes means absorbing heat from said solution at a first temperature within said second enclosure and releasing heat at substantially the same rate to said sea water in said first enclosure at a second temperature lower than said first temperature, said sea water in said first enclosure having thermal energy extracted therefrom by vaporization and said solution in said second enclosure having thermal energy imparted thereto by absorption of said vapor from said first enclosure by said solution in said second enclosure, said solution in said second enclosure comprising water as a solvent and having a solute concentration produced by at least one solute which develops a vapor pressure at said first temperature which is lower than the vapor pressure of said sea water in said first enclosure at said second temperature.

11. Energy conversion apparatus according to claim 10 wherein said energy-utilization means comprises a turbine sealed with said passageway and rotated by said flow of vapor from said first enclosure to said second enclosure, and an electrical generator rotated by said turbine producing an output of electrical energy.

12. The method of converting energy which comprises evacuating gas from spaces contiguous with different ones of two liquids producing different vapor pressures at different sites, one of which liquids contains solute developing a lower vapor pressure than that of the other liquid, coupling said spaces together to direct a flow of vapor from the space having the higher vapor pressure to the space having the lower vapor pressure, simultaneously coupling said liquids at said different sites in heat-exchange relationship with one another to direct a flow of thermal energy from said one of the liquids producing the lower vapor pressure to said other liquid producing the higher vapor pressure, replenishing the supply of said other liquid to replace that lost by vaporization, re-concentrating said one liquid to prevent dilution thereof and to preserve said lower vapor pressure thereof, and extracting energy from at least one of said flows between said sites.

13. The method of converting energy which comprises evacuating gas from enclosed spaces contiguous with sea water and with a solution concentrated with solute developing a lower vapor pressure than the vapor pressure of the sea water, coupling said enclosed spaces together to direct a flow of vapor from the space having the higher vapor pressure to the space having the lower vapor pressure, simultaneously coupling said sea water in one of said spaces in heat-exchange relationship with said concentrated solution in the other of said spaces to direct a flow of thermal energy from said concentrated solution to said sea water and thereby to preserve said concentrated solution and sea water at respective temperatures at which they produce the respective lower and high vapor pressures, replenishing the supply of said sea water in said one of said spaces to replace that lost by vaporization and to prevent concentration thereof, re-concentrating said concentrated solution by withdrawing said solution from said other space and exposing said solution to ambient atmospheric conditions, including solar radiation, and returning the re-concentrated solution to said other space, and extracting energy from at least one of said flows.

14. The method according to claim 13 wherein the step of extracting energy comprises directing said flow of vapor through a turbine and coupling said turbine in driving relationship to an electrical generator to produce an electrical power output.

15. The method according to claim 13 wherein the practice of extracting energy comprises coupling said concentrated solution in heat-exchange relationship with sea water in an enclosure, evacuating gas from said enclosure, and coupling the water vapor of the sea water in said enclosure in heat-exchange relationship with the sea water in said one space to condense said water vapor and produce fresh water.

No references cited.